United States Patent [19]
Nishimura et al.

[11] Patent Number: 4,717,976
[45] Date of Patent: Jan. 5, 1988

[54] APPARATUS USING DISC-SHAPED RECORD BEARING MEDIUM

[75] Inventors: Akimasa Nishimura; Nobuo Tezuka, both of Kanagawa, Japan

[73] Assignee: Canon Kabushiki Kaisha, Tokyo, Japan

[21] Appl. No.: 638,862

[22] Filed: Aug. 7, 1984

[30] Foreign Application Priority Data

Aug. 12, 1983 [JP] Japan .............................. 58-147804

[51] Int. Cl.⁴ .......................................... G11B 5/012
[52] U.S. Cl. ...................................... 360/97; 360/99; 369/48; 369/58
[58] Field of Search ................................ 360/97–99; 369/270–271, 48, 58

[56] References Cited

U.S. PATENT DOCUMENTS

| | | | |
|---|---|---|---|
| 3,890,643 | 6/1975 | Dalziel | 360/99 |
| 4,040,107 | 8/1977 | Bryer | 360/99 |
| 4,599,663 | 7/1986 | Saito | 360/97 |

Primary Examiner—S. J. Heinz
Attorney, Agent, or Firm—Toren, McGeady & Associates

[57] ABSTRACT

An apparatus using a disc-shaped record bearing medium having an engaging portion and at least one rotation indication portion, including a rotation mechanism for rotating the medium, a pressing device for mounting the medium on the rotation mechanism at the engaging portion, and a detection mechanism provided on a portion of the pressing device for detecting the rotation indication portion of the medium.

15 Claims, 11 Drawing Figures

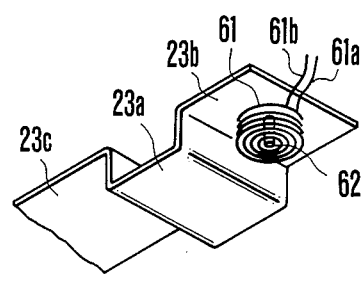
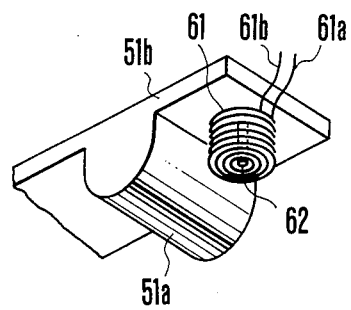
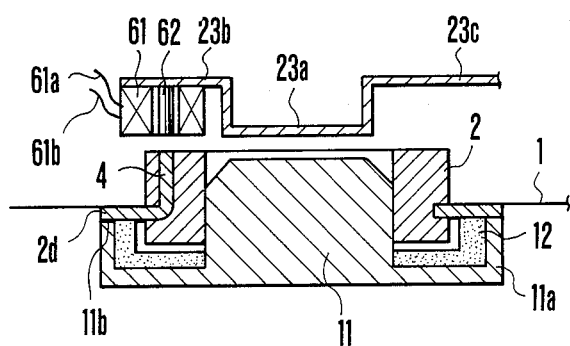
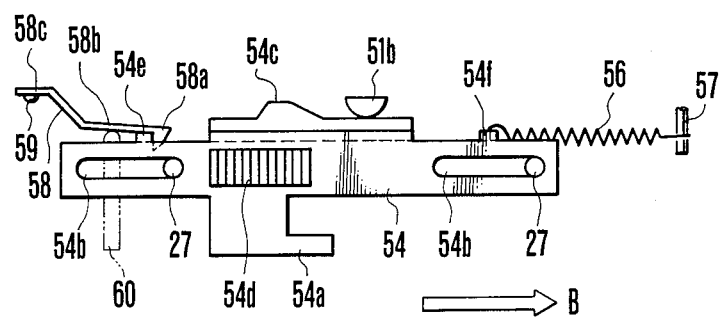

APPARATUS USING DISC-SHAPED RECORD BEARING MEDIUM

BACKGROUND OF THE INVENTION

1. Field of the Invention

The present invention relates to an apparatus using a disc-shaped record bearing medium having at least one rotation indication portion.

2. Description of the Prior Art

It is important for a recording and/or reproducing apparatus of the kind performing information recording or reproduction on or from such a record bearing medium as a rotary magnetic recording disc or the like to accurately and firmly mount the record bearing medium on a rotating driving shaft of the apparatus in such a manner as to avoid eccentricity of the medium relative to the driving shaft. Inaccurate mounting of the record bearing medium on the rotating driving shaft creates problems in that a recording or reproducing head of the apparatus inadequately contacts the record bearing medium, for example, due to an increase in spacing loss and in that the head deviates from recording tracks to degrade the reproducing characteristic of the apparatus due to the eccentricity.

To accurately mount the record bearing medium on the rotation driving shaft, therefore, there has been proposed a method of mounting the medium via a center core by arranging it in the middle part thereof. The center core is made of a plastic material and is arranged as a reinforcement member to receive and hold the driving shaft of the apparatus at the center of rotation of the record bearing medium which may be a magnetic disc. The center core is provided with a driving shaft inserting hole. The inserting hole is provided with positioning surfaces which are arranged to make the center of rotation of the medium coincide with that of the driving shaft and an elastic part which is arranged to push the driving shaft against these positioning surfaces. This method, however, necessitates arrangement of some means for pressing the center core onto the driving shaft to accurately and reliably mount the record bearing medium on the rotating driving shaft. In that instance, it is conceivable to allow the pressing means to rotate together with the driving shaft after mounting of the record bearing medium. Such arrangement, however, results in an increased inertia of the rotation system. Then, this either results in an increased size of the rotation drive source or a degradation of rotation accuracy. To avoid inconvenience, the abovestated pressing means is preferably arranged to be retractable immediately after completion of mounting of the record bearing medium.

Meanwhile, in cases where the signal such as a video signal to be recorded on the record bearing medium and the rotation of the record bearing medium must be synchronized with each other in phase, it becomes necessary to provide the record bearing medium with phase indicating means such as a magnetic pin and to detect the rotation phase of the record bearing medium by phase detecting means (magnetic pick-up means). In such a case, however, the phase detecting means must be arranged to be close to a rotating part. This requirement then further complicates the structural arrangement of the apparatus.

SUMMARY OF THE INVENTION

This invention is directed to the solution of the problems mentioned in the foregoing. It is therefore a principal object of the invention to provide a novel recording and/or reproducing apparatus using a disc-shaped record bearing medium which is provided with at least one rotation indicating portion.

It is a more specific object of the invention to provide a recording and/or reproducing apparatus which is arranged to reliably mount a record bearing medium by pressing the record bearing medium on rotating driving means and to permit simplification of rotation detecting means for detecting the rotation of the record bearing medium.

Under these objects, according to preferred embodiments embodying an aspect of the present invention, an apparatus using a disc-shaped record bearing medium having an engaging portion and at least one rotation indication portion, comprises rotation means for rotating the medium, pressing means for mounting the medium on the rotation means at the engaging portion, and detection means provided on a portion of the pressing means for detecting the rotation indication portion of the medium.

These and further objects and features of the invention will become apparent from the following detailed description of preferred embodiments thereof taken in conjunction with the accompanying drawings. BRIEF DESCRIPTION OF THE DRAWINGS Preferred embodiments of this invention are arranged as shown in the accompanying drawings in which:

FIGS. 8A and 8B are enlarged oblique views showing the essential parts of a phase detecting part included in the apparatuses of FIGS. 3 and 7.

FIG. 9 is a sectional view showing by way of example a relation between a phase detecting part and a record bearing medium mounting part arranged in the recording and/or reproducing apparatus according to the invention.

FIG. 10 is an illustration of another example of an external cover latch mechanism which is applicable to the apparatus of FIG. 7.

DETAILED DESCRIPTION OF THE PREFERRED EMBODIMENTS

Preferred embodiments of the present invention are arranged as described below:

For the purpose of this invention, the term "record bearing medium" as used herein means a disc-shaped rotary record bearing medium to be used for magnetic, optical or electrostatic capacity type recording and/or reproduction; and the term "record bearing medium rotating driving shaft" means a member such as a spindle coupled with a drive source such as a motor or the like. In the following description, the record bearing medium is a magnetic disc. The rotating driving shaft is a spindle which is mounted on the driving shaft of the motor. The description will proceed in the order of first and second embodiments of the recording and/or reproducing apparatus and the rotation phase detecting part thereof.

Figure 1:
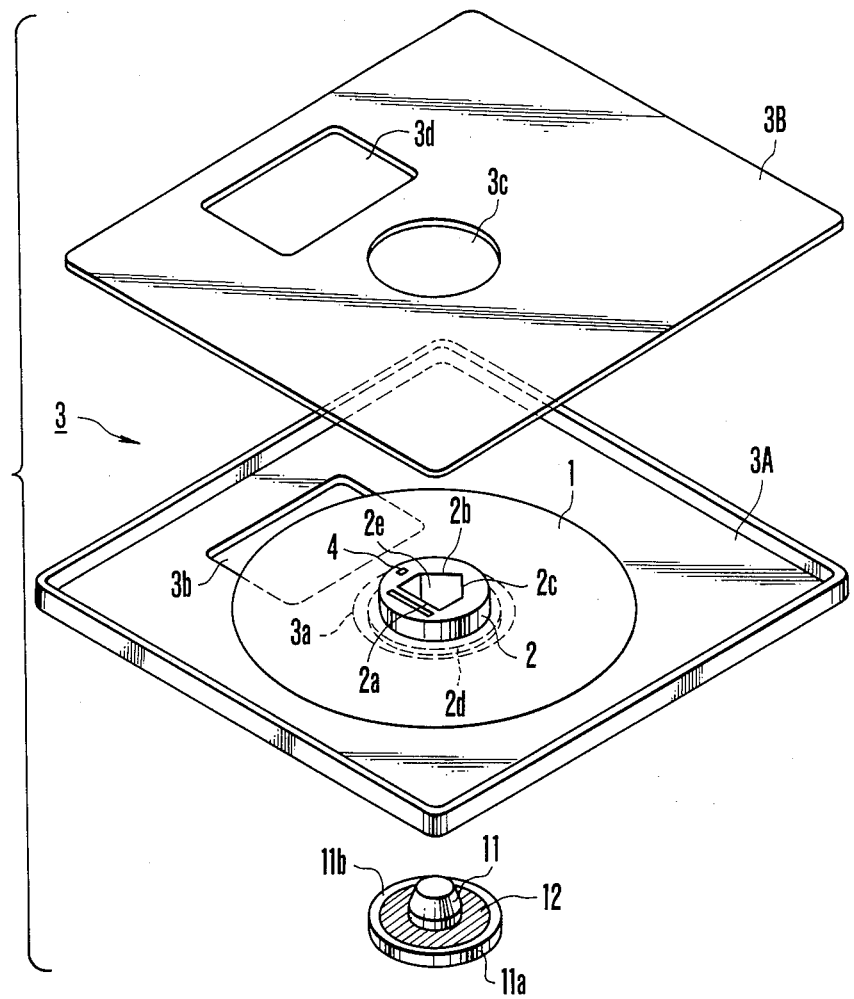
FIG. 1 is an exploded oblique view showing a magnetic disc cassette and a rotating spindle which is disposed on the side of a recording and/or reproducing apparatus.
Figure 2:
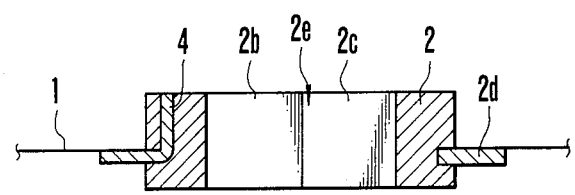
FIG. 2 is a sectional view showing the middle part of the magnetic disc shown in FIG. 1.

Referring first to FIG. 1, reference numeral 1 denotes a magnetic disc employed as the record bearing medium. The magnetic disc 1 is provided with a center core 2 (which may be also called a center hub) which is made of, for example, a plastic material and is secured to the middle part of the magnetic disc 1 to serve as the mounting part thereof. A spring part 2a is formed at a part of a middle hole 2e of the center core 2 to serve as an elastic part thereof. Slanting face parts 2b and 2c are arranged opposite to the spring part 2a to serve as positioning faces for a driving spindle 11. Attraction plate 2d is made of a magnetizable material such as iron and is arranged in one unified body with the center core 2 and is disposed on the reverse side of the center core 2. The lower half 3A of a container or cassette 3 which protectively houses the magnetic disc 1 is provided with an opening 3a for allowing a flange part 11a of a spindle 11 to be inserted therein and another opening 3b for allowing a magnetic head which will be described later to be inserted therein. An upper half 3B of the cassette 3 is provided with an opening 3c the center core 2 may extend and another opening 3d for allowing a stabilizing plate 22 which will be described later to be inserted therein. A magnetizable pin 4 which is employed as a rotation phase indicating part is provided on the center core 2. The magnetizable pin 4 is formed by bending a portion of the attraction plate 2d in a manner as shown in FIG. 2. Alternatively, the rotation phase indicating part may be formed by forming the attraction plate 2d in a ring shape along the lower surface of the center core 2 and by attaching a magnetizable pin to the plate 2d by caulking or the like in such a manner as to have it penetrate through the center core 2 and extend to the upper surface thereof.

The rotating driving spindle 11 is provided on the recording and/or reproducing apparatus and is arranged to drive and rotate the magnetic disc 1 within the cassette 3. A permanent magnet 12 is disposed at the flange part 11a of the spindle 11 and is arranged to attract the attraction plate 2d which is disposed at the lower surface of the center core 2 of the disc 1. The flange face 11b of the flange part 11a serves as reference plane for determining height of the disc 1 relative to the head.

With the arrangement made as described above, when the recording and/or reproducing apparatus is loaded with the cassette 3, the attraction plate 2d of the center core 2 is attracted by the permanent magnet 12. At that instant, the slanting face parts 2b and 2c of the middle hole 2e are pressed by the spring part 2a against the side face of the spindle 11. Therefore, in accordance with this arrangement, the force of pressed contact between the spindle 11 and the center core 2 and the force of attraction between the permanent magnet 12 and the attraction plate 2d jointly serve to rotate the magnetic disc 1 together with the spindle 11 in one unified body. Further, the possibility of occurrence of any eccentricity that is mentioned in the foregoing is lessened by the actions of the slanting faces 2b and 2c and the spring part 2a of the middle hole 2e provided in the center core 2. In addition to that, the attraction force of the permanent magnet 12 serves to permit the magnetic disc 1 to be accurately positioned in the vertical direction relative to the head. Further, since the rotating parts are thus simply arranged, the inertia of the rotation system is small to contribute to reduction in size of the whole apparatus.

In the structural arrangement described, the magnetic disc 1 is mounted on the spindle 11 with the pressed contact force of the spindle 11 and the center core 2 overcome by the suction force of the permanent magnet 12. However, there is the possibility that the dimensional precision and surface condition or the spindle 11 and the dimensional precision and variations in dimensions due to temperature, humidity, etc. of the center core 2 might cause a change in the pressed contact force of the spindle 11 and the center core 2. Then, it tends to become no longer possible to reliably mount the disc 1 on the spindle 11 by the attractive force of the permanent magnet 12. Then, if the attractive force of the permanent magnet 12 is increased and the pressing force of the spring part 2a of the center core 2 is arranged to be weaker, eccentricity would arise at the disc 1. Therefore, even with the apparatus arranged as shown in FIG. 1, the disc 1 still cannot be reliably mounted and the above-stated problem still remains unsolved.

To solve this problem of unreliable mounting, the embodiment of the invention is arranged as follows: The center core 2 is pressed against the rotating driving spindle 11. However, when the disc 1 is rotated for a recording or reproducing operation, the pressing of the center core 2 is released to save the spindle 11 from an excessive load.

Figure 3:
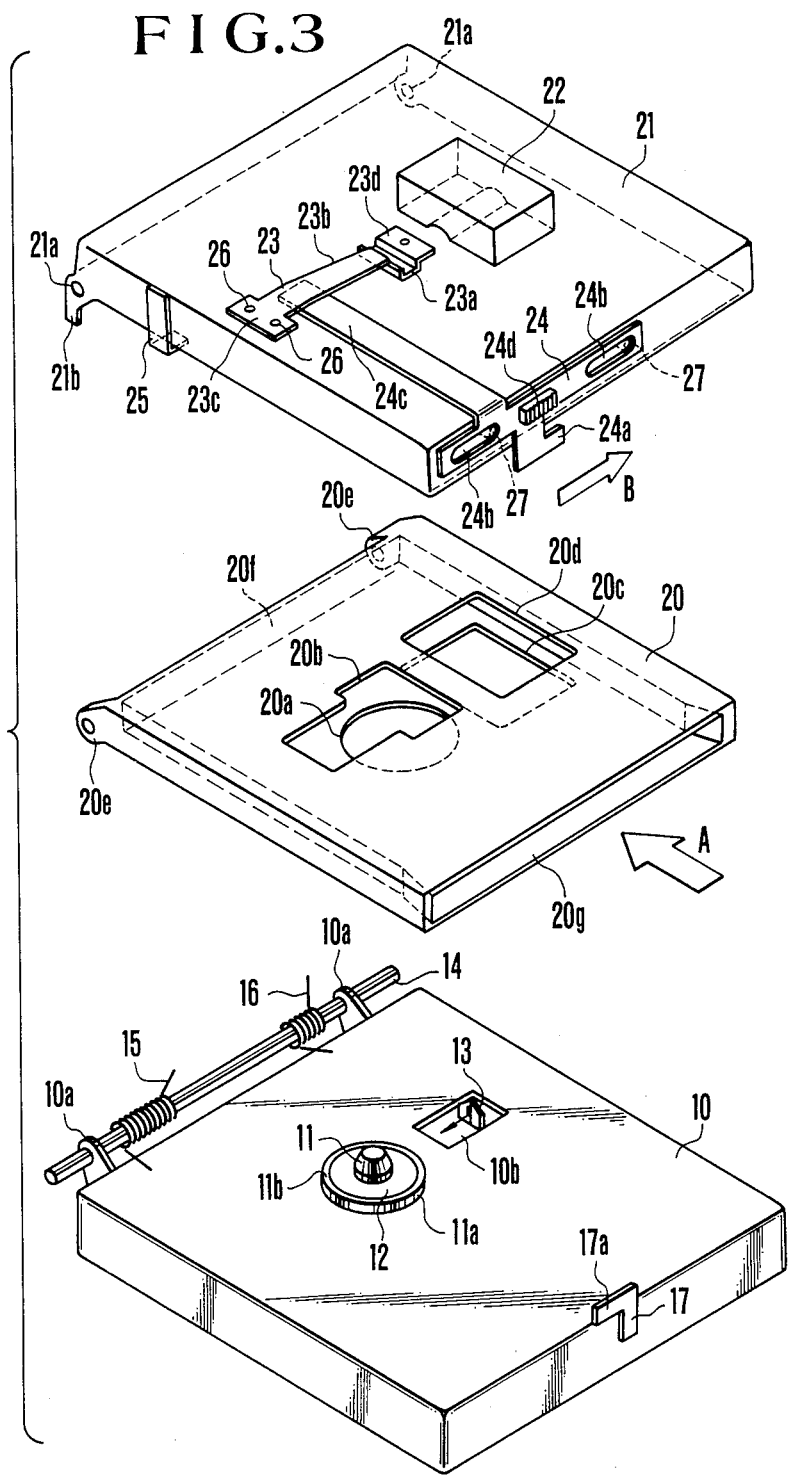
FIG. 3 is an exploded oblique view of a first embodiment of this invention.

Referring to FIGS. 3-6, a first embodiment of the invention will be first described. In FIG. 3, reference numeral 10 denotes the body of a recording and/or reproducing apparatus. Numerals 11 and 12 respectively denote the rotating driving spindle and the permanent magnet which have been described with reference to FIG. 1 in the foregoing. The apparatus includes a magnetic head 13 which is shown as an example of the recording and/or reproducing head. The head 13 is arranged to perform information recording or reproduction by coming into contact with the recording surface of the magnetic disc 1 via an opening 10b provided in the body 10 and an opening 3b provided in the cassette 3. Suitable shifting means (not shown) is arranged to shift the position of the head 13 in the radial direction of the disc 1 as shown by an arrow in the drawing. A hinge shaft 14 is arranged to pivotally carry a cassette holder 20 and an outer cover 21 which will be described later on the apparatus body 10. The shaft 14 is carried by ear parts 10a of the body 10 and is provided with two springs 15 and 16. The spring 15 is arranged between the body 10 and the outer cover 21 to urge the cover 21 in the opening direction. The other spring 16 is arranged between the holder 20 and the outer cover 21 to urge both of them in their opening directions. A hook member 17 is arranged to latch the outer cover 21 onto the body 10 in a closed state in conjunction with a latch member 24 which will be described later herein.

The cassette holder 20 is arranged as a record bearing medium housing part to accommodate the cassette 3 which is shown in FIG. 1. The cassette 3 is inserted into the cassette holder 20 in the direction of arrow A through an opening 20g provided in the holder. In this example, the magnetic disc 1 is thus housed by the cassette 3 which in turn is inserted into the cassette holder 20. Then, on top of that, the outer cover 21 covers the holder 20. The holder 20 may be omitted by providing the outer cover 21 with a cassette housing part. The flange part 11a of a spindle 11, the fore end pressing part 23a of a pressing member which will be described later, the head 13 and a stabilizing plate 22 which will be described later are arranged to be insertable into openings 20a, 20b, 20c and 20d which are respectively provided in the upper and lower sides of the holder 20. The stabilizing plate 22 is arranged to have the magnetic disc 1 stably travel close to the head 13. The holder 20 is pivotally carried by the hinge shaft 14 at the ear parts 20e thereof and is turnable relative to the body 10. The outer cover 21 is likewise pivotally carried by the hinge shaft 14 at its ear parts 21a. The outer cover 21 is provided with the stabilizing plate 22 and an engaging member 25 which is arranged to hook the holder 20 against the force of a spring 16.

A center core pressing member 23 is made of an elastic material such as a leaf spring. The pressing member 23 has its tail end 23c secured to the ceiling face of the outer cover 21 and the other end formed into a fore end pressing part 23a which is arranged to abut on the upper surface of the center core 2 of the magnetic disc 1. Further, the fore end of the pressing member 23 is also formed into a bent part 23d which is arranged to have a phase detecting member mounted thereon as will be further described later. The intermediate portion of the pressing member 23 is formed into a slanting surface part 23c which is slanting relative to the center core 2. In this embodiment, the pressing member 23 serves as pressing means for pressing the center core 2 onto the rotating driving spindle 11.

The latch member 24 is provided with a hook part 24a which is arranged to engage with the hook part 17a of the hook member 17 which is disposed on the body 10. The latch member 24 is movable in the direction of arrow B and in the direction opposite thereto along slots 24b which are fitted on pins 27 provided on the outer cover 21. The movement of the latch member 24 is arranged to be stopped at two ends of the movement by suitable means such as click stoppers or the like. An arm part 24c of the latch member 24 extends to the lower side of the slanting surface part 23c of the pressing member 23. The latch member 24 is further provided with an operation knob 24d. Under the condition of FIG. 3, the arm part 24c is not in contact with the slanting surface part 23c and the fore end pressing part 23a of the pressing member 23 pushes the center core 2. However, when the latch member 24 is moved in the direction of arrow B, the arm part 24c comes into contact with the slanting surface part 23c to push upward. In that event, the fore end pressing part 23a is raised upward as viewed in the drawing together with the slanting surface part 23c. This releases the center core 2 from being pushed by the pressing member 23.

Figure 4:
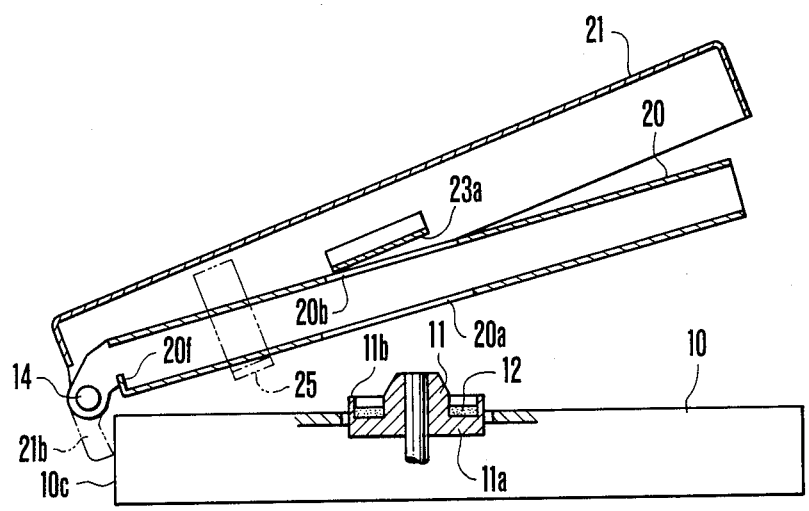
FIGS. 4, 5 and 6 are illustrations of the operation of the apparatus shown in FIG. 3.
Figure 5:
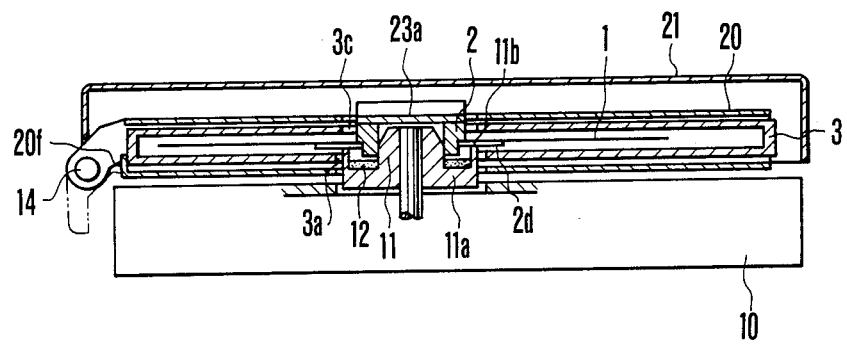
Figure 6:
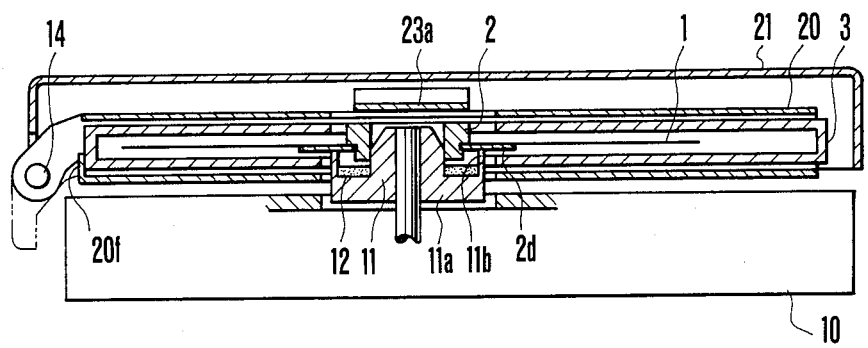

Referring now also to FIGS. 4, 5 and 6 together with FIG. 3, the apparatus of FIG. 3 operates as follows: FIG. 4 shows the apparatus as in a state before the cassette 3 is inserted into the holder 20. Under this condition, the outer cover 21 is urged to turn counterclockwise on the shaft 14 relative to the body 10 by the force of the spring 15. A protrudent part 21b of the cover 21 abuts on one side 10c of the body 10 to keep the cover 21 in the position shown in FIG. 4. Meanwhile, the holder 20 is urged by the force of the spring 16 to turn clockwise relative to the outer cover 21. However, the engaging member 25 provided on the outer cover 21 engages with the holder 20 and thus also keeps it in the position as shown in FIG. 4, i.e. in a predetermined first position permitting the cassette 3 to be inserted and taken out.

FIG. 5 shows the apparatus as in a state of having the outer cover closed with the cassette 3 having been inserted through the opening 20g into the holder 20 until the insertion is restricted by the restricting part 20f of the holder 20. In this instance, the holer 20 abuts on a stopping part (not shown) but is provided on the body 10 for stopping the holder 20 in that position. This is a predetermined second position in which the cassette 3 is placed at a predetermined position for recording and/or reproduction. Under the condition of FIG. 5, the fore end pressing part 23a of the center core pressing member 23 pushes the upper surface of the center core 2 to forcedly press the center core 2 against the spindle 11 until the lower surface of the attraction plate 2d comes to abut on the flange face 11b of the flange part 11a of the spindle 11. The pressing force of the pressing member 23 which is made of an elastic member is arranged to become in this instance greater than a fictional force exerted between the spindle 11 and the center core 2.

Next, when the latch member 24 is shifted in the direction of arrow B shown in FIG. 3 by operating the operation knob 24b to cause thereby the hook 24a of the latch member 24 to engage with the hook part 17a of the hook member 17 disposed on the body 10, the arm part 24c of the latch member 24 pushes up the slanting surface part 23c of the pressing member 23. As a result, the fore end pressing part 23a of the pressing member 23 is detached from the center core 2 and the pressing action of the pressing member 23 comes to an end. Then, there obtains a condition as shown in FIG. 6. This arrangement thus ensures reliable and accurate mounting of the magnetic disc 1 on the spindle 11 and yet the pressing member 23 never imposes any load on the spindle 11 when the disc 1 is rotated for recording or reproduction.

In taking out the cassette 2 from the holder 20, the above-stated processes of operation are carried out in the reverse sequence.

Figure 7:
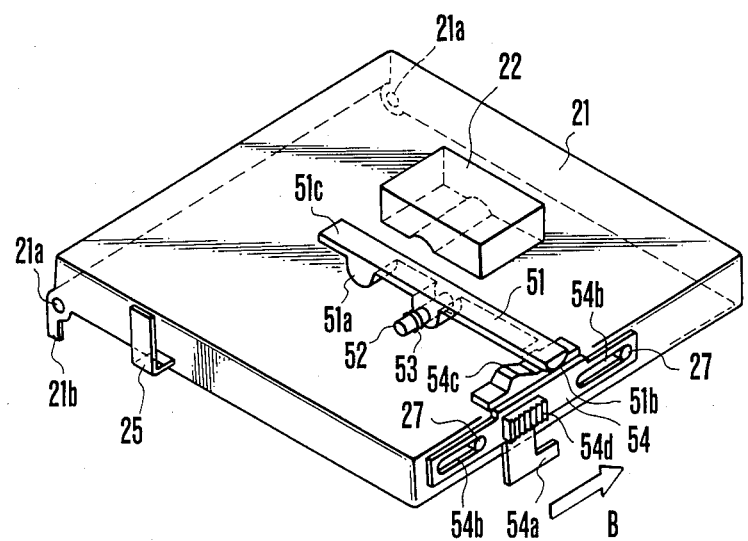
FIG. 7 is an oblique view showing the essential parts of a second embodiment of the invention.

FIG. 7 shows a second embodiment of this invention. Since the body of the recording and/or reproducing apparatus and the cassette holder for the record bearing medium of this embodiment are identical with those shown in FIG. 3, they are omitted from illustration of FIG. 7. Further, members indicated by the same reference numerals as those used in FIG. 3 are arranged and function basically in the same manner as the corresponding ones shown in FIG. 3.

Referring to FIG. 7, the second embodiment includes a pressing member 51, a shaft 52 which is disposed at the ceiling of the outer cover 21 and a spring 53. The pressing member 51 is pivotally carried by the shaft 52 and is turnable thereon. The spring 53 urges the pressing member 51 to turn clockwise. The fore and 51a of the pressing member 51 is formed into a center core pressing part. The further fore end of the pressing member 51 is formed into an eaves part 51c which is provided for mounting a phase detecting member thereon. The tail end 51b of the pressing member 51 is formed into a cam follower and is arranged to engage with a cam 54c which will be described later. The middle portion of the pressing member 51 between these two end parts is arranged to be flexible. A latch member 54 is provided with a hook part 54a which is arranged to engage with the hook part 17a of a hook member 17 which is disposed on the side of the body 10. Like the latch member 24 of FIG. 3, the hook part 54a of the latch member 54 is shiftable in the direction of arrow B in the opposite direction along slots 54b which are arranged to engage with the pins 27 of the outer cover 21. The cam 54c is provided with a protrudent cam face which is formed in the middle part of the cam 54c. The end part 51c of the pressing member 51 is arranged to abut on the cam 54c. The latch member 54 is provided with an operation knob 54d.

With the embodiment arranged in the manner as described above, when the cassette 3 is inserted into the holder 20 and the outer cover 21 is closed, unlike in the case of FIG. 5, the fore end pressing part 51a of the pressing member 51 is not in contact with the center core 2 with the outer cover 21 closed. Therefore, the operation knob 54d is operated to shift the latch member 54 in the direction of arrow B. Then, in the process of engaging the hook part 54a with the hook part 17a of the hook member 17 of the body 10, the protrudent part of the cam 54c pushes up the tail end 51b of the pressing member 51. This causes the pressing member 51 to turn counterclockwise against the force of the spring 53. The fore end pressing part 51a then comes to push the upper surface of the center core 2 onto the spindle 11. The cam 54c further moves according as the latch member 54 further moves in the direction of arrow B. When the flat portion of the cam 54c comes to confront the tail end 51c of the pressing member 51, the pressing member 51 is caused to turn clockwise by the force of the spring 53. Upon completion of the locking action of the latch member 54, the fore end pressing part 51a of the pressing member 51 comes away from the center core 2 to prevent a load on the spindle 11 when the disc is rotated for recording or reproduction.

While the apparatus of FIG. 7 is arranged as described above, the latching action of the latch member 54 on the outer cover 21 may be arranged to automatically take place in response to a closing operation on the outer cover 21. This modification is also applicable to the apparatus of FIG. 3. An example of this automatic latching arrangement is as shown in FIG. 10. Referring to FIG. 10, the latch member 54 in this case is urged in the direction of arrow B by a coiled spring 56 arranged between a spring peg part 54f provided on the latch member 54 and a pin 57 provided at the ceiling of the outer cover 21. Under the condition illustrated, the latch member 54 is kept in an end position of its movement in the direction opposite to the direction of arrow B with the arm part 54e thereof being caught by a hook part 58a formed at the fore end of an arresting member 58. The arresting member 58 is made of an elastic material such as a leaf spring or the like and is secured at its tail end part 58c to the ceiling of the outer cover 21 by means of a screw 59. A downward stepped part 58b is provided between the tail end part 58c and the fore end hook part 58a of the arresting member 58.

When the outer cover 21 is closed on the body 10, the arm part 54e of the latch member 54 is released from being caught by the arresting member 58 with a release pin 60 being arranged to come to engage with the stepped part 58b of the arresting member 58 behind the arm part 54e of the latch member 54.

With the outer cover 21 closed as shown in FIG. 5, therefore, the latch member 54 is released from the arresting member 58 by virtue of the release pin 60 which is disposed on the side of the body 10. Then, the spring 56 causes the latch member 54 to move in the direction of arrow B. With the latch member 54 moved in this manner, the center core 2 is pushed and then is released from the pushed state by the pressing member 51 through the cam 54c during the movement of the latch member 54 until the hook part 54a of the latch member 54 comes to engage with the hook part 17a of the hook member 17 disposed on the side of the body 10 as described in the foregoing with reference to FIG. 7.

The outer cover 21 of course can be opened by shifting the latch member 54 against the force of the spring 56 in the direction opposite to the arrow B through the operation knob 54d. Then, the latch member 54 is again arrested by the arresting member 58 at the end of the movement in the direction opposite to the arrow B.

The pressing means for pressing the mounting part of a record bearing medium and the means for releasing the pressing action arranged according to the invention may be replaced with some different arrangement. For example, the mounting part of the record bearing medium may be mounted on a rotating driving shaft by allowing pressing means to act on the mounting part of the record bearing medium in response to a record bearing medium loading operation and pressing means may be moved away from the mounting part after mounting as has been disclosed in U.S. patent application Ser. No. 591,383 filed Mar. 20, 1984 abandoned. In another possible way of arrangement, pressing means is arranged to press the mounting part of a record bearing medium onto a rotating driving part and to stop pressing in accordance with the operation of recording or reproducing head shifting means as disclosed in another patent application to be filed by one of the present inventors.

Next, referring to FIGS. 8A, 8B and 9, examples of the rotating phase detecting member usable for the apparatuses of FIGS. 3 and 7 will be described. FIGS. 8A and 8B show the details of the rotation phase detecting members employed in the recording and/or reproducing apparatuses shown in FIGS. 3 and 7. The illustrations of these drawings include a detection coil 61, lead wires 61a and 61b of the detection coil 61 and a detection pin 62. The detection pin 62 is made of a magnetic material such as a soft magnetic material. The detection pin 62 is secured to the fore end part 23b or 51b of the pressing member 23 or 51 by press fitting or caulking. Meanwhile, the detection coil 61 is arranged to encompass the detecting pin 62 and is secured to the fore end part 23b or 51b by adhesion, etc. The detection pin 62 is disposed on the rotating locus of magnetizable pin 4 which is provided on the center core 2 as a rotation phase indication member. Under the disc mounting completed condition as shown in FIG. 6, the detection pin 62 is kept in a fixed state at a given distance from the rotating locus of the magnetizable pin 4.

FIG. 9 shows the relation between the center core 2 and the phase detecting means 61 and 62 under the condition of having completed mounting the disc 1 on the spindle 11. FIG. 9 uses the same reference numerals as those used in FIGS. 1 to 8. Referring to FIG. 9, the magnetic flux of the permanent magnet 12 passes the attraction plate 2d and the magnetizable pin 4 which is formed by bending a portion of the attraction plate 2d. Therefore, the intensity of the magnetic field in the area close to the fore end of the magnetizable pin 4 differs from other parts. Accordingly, when the center core 2 rotates, a change of magnetic flux takes place at the detection pin 62 according to the rotation of the center core 2. Then, electromagnetic induction brings about a pulse-like voltage between the terminals 61b and 61b of the detection coil 61. This pulse-like voltage is produced once per one revolution of the center core 2 and thus becomes a rotation phase signal. The phase signal is processed in a known manner by a detection circuit, a control circuit, etc. (not shown). With the phase signal thus processed, a control signal for the disc rotating motor, for example, is adjusted to have the rotation phase of the magnetic disc 1 synchronized with, for example, a vertical synchronizing signal or the like included in a recording or reproducing signal such as a video signal. Or, the rotation speed of the magnetic disc 1 is controlled according to the phase signal. The center core 2 may be provided with a plurality of the magnetizable pins 4.

In case that the recording signal is a video signal, arrangement to synchronize the rotation of the disc 1 with the vertical synchronizing signal by using a single piece of the magnetizable pin 4 permits recording of one field portion of the video signal per one revolution of the disc 1. Then, in that instance, the head of each field portion of the video signal, i.e. the position of the vertical synchronizing signal, can be aligned on a radial line of the disc 1.

As will be understood from FIG. 9, the downward protruding extent of the pressing part 23a or 51a must be arranged to be larger than the protruding extents of the detection coil 61 and the detection pin 62 in order to prevent the coil 61 and the pin 62 from being damaged by coming in contact with the upper surface of the center core 2 during the operation of the pressing member 23 or 51.

Further, for accurately detecting the magnetizable pin 4, the detecting means including the detection coil 61 and the detection pin 62 must be correctly set in a position away from the upper surface of the center core 2 at a predetermined distance under the condition as shown in FIG. 9. In view of this, under the condition having the center core 2 released from pressing as shown in FIG. 6, the pressing member 23 or 51 and particularly its pressing part 23a or 51a must be correctly positioned. Therefore, in the case of the apparatus of FIG. 3, for example, the slanting degree of the slanting face part 23b of the pressing member 23 and the moving extent and height of the arm part 24c of the latch member 24 must be adjusted or formed to satisfy the above-stated condition. In the case of the apparatus of FIG. 7, the lift of the flat part of the cam 54c of the latch member 54 also must be adjusted or formed to meet the above-stated condition.

In modification of the embodiments of the invention, the rotation indicating part of the record bearing medium may be arranged, for example, in the form of a piercing hole in such a manner as seen in a floppy disc device, and the rotation detecting means is arranged to be a photo-coupler consisting of a light emitting element and a light-sensitive element. In that event, either one of the light emitting element and the light-sensitive element may be disposed at the pressing member 23 or 51. If the rotation indicating part is arranged in the form of a light reflecting face, both the light emitting element and the light-sensitive element may be disposed at the pressing member 23 or 51.

The present invention is thus not limited to the embodiments described in the foregoing but permits various modifications without departing from the spirit and the scope thereof.

In accordance with the invention, as described in the foregoing, the pressing means for pressing the mounting part of the record bearing medium onto the record bearing medium rotating means is provided with the detecting means for detecting the rotation phase of the record bearing medium. Therefore, the invention not only ensures reliable mounting of the medium on the rotating means but also dispenses with a member for mounting discrete rotation phase detecting means. This permits rotation detection with simple structural arrangement and contributes to reduction in size of the apparatus and cost of the manufacture thereof.

What is claimed is:

1. An apparatus using a disc-shaped record bearing medium having an engaging portion and at least one rotation indication portion, comprising:
   (A) rotation means for retaining and rotating the medium;
   (B) pressing means for pressing the medium to load the medium on said rotation means at the engaging portion of the medium, said pressing means ceasing the pressing of the medium while said medium is rotating; and
   (C) detection means for detecting the rotation indication portion of the medium while said medium rotates, at least a portion of said detection means being provided on a portion of said pressing means.

2. The apparatus according to claim 1, wherein said pressing means is arranged for pressing the engaging portion of the medium for loading the medium on said rotation means.

3. the apparatus according to claim 2, further comprising:
   control means for causing said pressing means to release said pressing of the engaging portion of the medium, said control means being arranged to position said detecting means at a predetermined position near the rotation indication portion of the medium when the pressing of the engaging portion of the medium by the pressing means is released.

4. The apparatus according to claim 3, further comprising:
   holder means for holding the medium, said holder means being movable between a first position for receiving the medium and a second position for positioning the received medium at a predetermined position relative to said rotating means; and
   latching means for latching said holder means at said second position,
   said release means being arranged to control said pressing means in response to said latching means.

5. The apparatus according to claim 2, further comprising:
   control means for causing said pressing means to press the engaging portion of the medium relative to said rotation means and thereafter release said pressing, said control means being arranged to position said detection means at a predetermined position relative to the locus of the rotation indication portion of the medium when the pressing of the engaging portion of the medium by the pressing means is released.

6. The apparatus according to claim 5, further comprising:
   holder means for holding the medium, said holder means being movable between a first position for receiving the medium and a second position for positioning the received medium at a predetermined position relative to said rotating means; and
   latching means for latching said holder means at said second position, said control means being arranged to control said pressing means is response to said latching means.

7. A recording and/or reproducing apparatus arranged to use a disc-shaped record bearing medium having an engaging portion and at least one rotation indication portion, said apparatus comprising:
(A) recording and/or reproducing head means for recording signals on and/or reproducing recorded signals from said record bearing medium;
(B) rotating means for rotating the medium relative to said head means, said rotating means being engageable with said engaging portion of the medium and having a receiving surface for receiving thereon the engaging portion of the medium;
(C) pressing means for pressing said engaging portion of the medium against said receiving surface of the rotating means, said pressing means ceasing the pressing of the medium while said medium is rotating; and
(D) detection means for detecting the rotation indication portion of the medium while said medium rotates, said detection means being at least partially provided on a portion of said pressing means.

8. The apparatus according to claim 7, further comprising:
control means for causing said pressing means to release said pressing, said control means being arranged to position said detection means at a predetermined position relative to the locus of the rotation indication portion of the medium when the pressing of the engaging portion of the medium by the pressing means is released.

9. The apparatus according to claim 8, further comprising:
holder means for holding the medium, said holder means being movable between a first position for receiving the medium and a second position for positioning the received medium at a predetermined position relative to said rotating means; and
latching means for latching said holder means at said second position,
said control means being arranged to control said pressing means in response to said latching means.

10. The apparatus according to claim 7, further comprising:
control means for causing said pressing means to press the engaging portion of the medium relative to said rotation means and thereafter release said pressing, said control means being arranged to position said detection means at a predetermined position relative to the locus of the rotation indication portion of the medium when the pressing of the engaging portion of the medium by the pressing means is released.

11. The apparatus according to claim 10, further comprising:
holder means for holding the medium, said holder means being movable between a first position for receiving the medium and a second position for positioning the received medium at a predetermined position relative to said rotating means; and
latching means for latching said holder means at said second position,
said control means being arranged to control said pressing means in response to said latching means.

12. Ad apparatus for recording signals on and/or reproducing recorded signals from a flexible magnetic disc housed in a cassette and having a center core attached at a central portion thereof and provided with an engaging hole and at least one rotation phase indication member, said cassette having a window for exposing a portion of said disc, said apparatus comprising:
(A) a magnetic head for recording signals on and/or reproducing recorded signals from the disc;
(B) a spindle engageable with said engaging hole of the center core of the disc, said spindle having a flange portion for receiving thereon said center core;
(C) a cassette holder positionable at a first position for receiving therein said cassette and a second position for placing the received cassette at a predetermined position to cause the disc within the received cassette to gain access to said head through said window of the cassette;
(D) a pressure member for pressing said center core of the disc against said flange portion of the spindle, said pressure member ceasing the pressing of said center core of the disc while said medium is rotating; and
(E) a detection member for detecting the rotation phase indication member of the disc while said medium rotates, said detection member being supported by said pressure member.

13. The apparatus according to claim 12, further comprising:
a positioning mechanism for positioning said pressure member at a predetermined released position and for positioning said detection member at a predetermined detecting portion relative to the locus of the indication member of the disc.

14. An apparatus for recording signals on and/or reproducing recorded signals from a flexible magnetic disc housed in a cassette and having a center core attached at a central portion thereof and provided with an engaging hole and at least one magnetizable member, said cassette having a window for exposing a portion of said disc, said apparatus comprising:
(A) a magnetic head for recording signals on and/or reproducing recorded signals from the disc;
(B) a spindle engageable with said engaging hole of the center core of the disc, said spindle having a flange portion for receiving thereon said center core;
(C) a magnet provided on the flange portion of said spindle;
(D) a cassette holder for holding said cassette, said cassette holder being movable from a first to a second position for causing said disc within the held cassette to gain access to said head through said window of the cassette;
(E) a pressure member for pressing said center core of tbe disc against said flange portion of the spindle, said pressure member ceasing the pressing of the medium while said medium is rotating; and
(F) a pick-up member for picking up a magnetic flux of said magnet guided through a predetermined portion of said magnetizable member of the disc, said pick-up member being supported by said pressure member.

15. The apparatus according to claim 14, further comprising:
a positioning mechanism for positioning said pressure member at a predetermined released position and for positioning said detection member at a predetermined detecting portion near the indication member of the disc.

* * * * *